(12) United States Patent
Stievater et al.

(10) Patent No.: US 12,645,029 B2
(45) Date of Patent: Jun. 2, 2026

(54) METHODS AND APPARATUSES FOR PHOTONIC FILTERING USING NONUNIFORM LATTICE FILTERS

(71) Applicant: The Government of the United States, as represented by the Secretary of the Navy, Washington, DC (US)

(72) Inventors: Todd H. Stievater, Arlington, VA (US); Nathan Tyndall, Alexandria, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 209 days.

(21) Appl. No.: 18/213,253

(22) Filed: Jun. 22, 2023

(65) Prior Publication Data

US 2023/0417988 A1     Dec. 28, 2023

Related U.S. Application Data

(60) Provisional application No. 63/354,537, filed on Jun. 22, 2022.

(51) Int. Cl.
| | |
|---|---|
| *G02B 6/122* | (2006.01) |
| *G02B 6/293* | (2006.01) |
| *G02F 1/313* | (2006.01) |

(52) U.S. Cl.
CPC ....... *G02B 6/1225* (2013.01); *G02B 6/29355* (2013.01); *G02F 1/3132* (2013.01)

(58) Field of Classification Search
CPC .. G02B 6/1225; G02B 6/29355; G02F 1/3132
See application file for complete search history.

(56) References Cited

U.S. PATENT DOCUMENTS

| | | | | |
|---|---|---|---|---|
| 5,309,534 A | * | 5/1994 | Cohen | G02B 6/12007 385/27 |
| 5,596,661 A | * | 1/1997 | Henry | G02B 6/29355 385/24 |
| 5,719,976 A | * | 2/1998 | Henry | G02B 6/12009 385/28 |

(Continued)

*Primary Examiner* — Ryan A Lepisto
(74) *Attorney, Agent, or Firm* — U.S. Naval Research Laboratory

(57) ABSTRACT

Method and apparatuses for photonic filtering using n-stage nonuniform lattice filters are provided. The n-stage nonuniform lattice filters include a plurality of directional coupler-differential delay devices connected in series. Each device includes a directional coupler section and a differential delay section. Each coupler section has a coupling constant. Each differential delay section has a differential delay. The first device receives a pump and a signal. The end-stage directional coupler is connected in series to last device and includes input, through, and cross ports. The end-stage directional coupler has a coupling constant, and at least one of the coupling constants for the directional coupler sections and the coupling constant for the end-stage directional coupler are different. The signal is output on the through port of the end-stage directional coupler, and the pump is output on the cross port of the end-stage directional coupler.

11 Claims, 18 Drawing Sheets

(56) References Cited

U.S. PATENT DOCUMENTS

| 6,633,698 | B2 * | 10/2003 | Hatayama | G02F 1/225 |
| | | | | 385/27 |
| 6,636,661 | B1 * | 10/2003 | Zeng | H04B 10/25133 |
| | | | | 359/332 |
| 6,810,174 | B2 * | 10/2004 | Gao | H04B 10/25133 |
| | | | | 385/27 |
| 6,829,407 | B2 * | 12/2004 | Hatayama | G02B 6/12007 |
| | | | | 385/5 |
| 7,437,392 | B2 * | 10/2008 | Koster | G02B 6/12007 |
| | | | | 708/300 |
| 7,469,079 | B2 * | 12/2008 | Nara | G02B 6/2938 |
| | | | | 385/24 |
| 7,519,240 | B1 * | 4/2009 | Little | G02B 6/122 |
| | | | | 385/11 |
| 7,835,606 | B2 * | 11/2010 | Okayama | G02B 6/12007 |
| | | | | 385/27 |
| 7,840,103 | B2 * | 11/2010 | Chen | H04B 10/2513 |
| | | | | 398/79 |
| 7,860,359 | B2 * | 12/2010 | Cherchi | G02B 6/12007 |
| | | | | 385/27 |
| 8,224,139 | B2 * | 7/2012 | Little | G02B 6/12007 |
| | | | | 359/337.11 |
| 10,890,717 | B2 * | 1/2021 | Melloni | H04B 10/25 |
| 2003/0095738 | A1 * | 5/2003 | Hatayama | H04B 10/2935 |
| | | | | 385/129 |

* cited by examiner

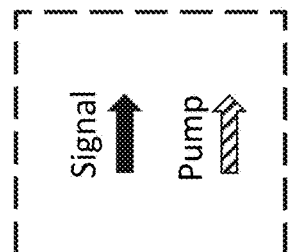
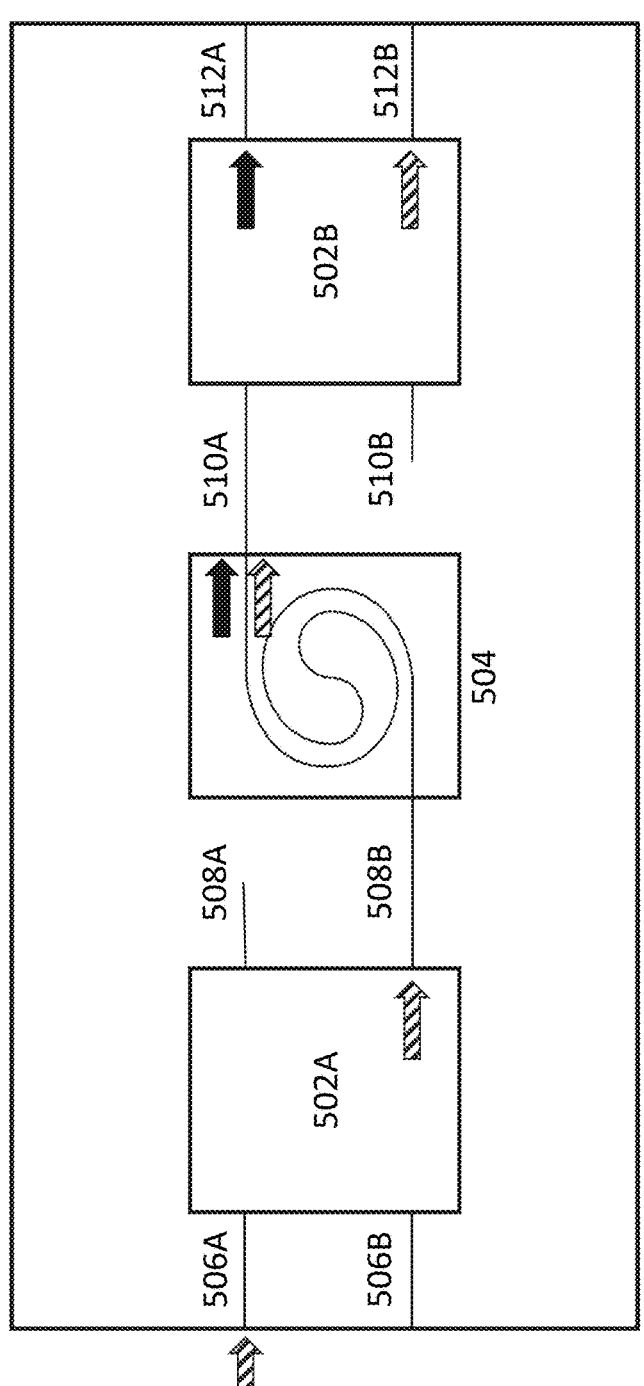
*FIG. 5A*

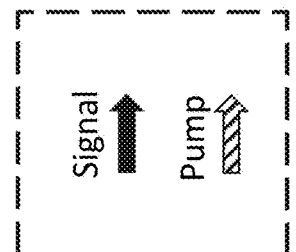
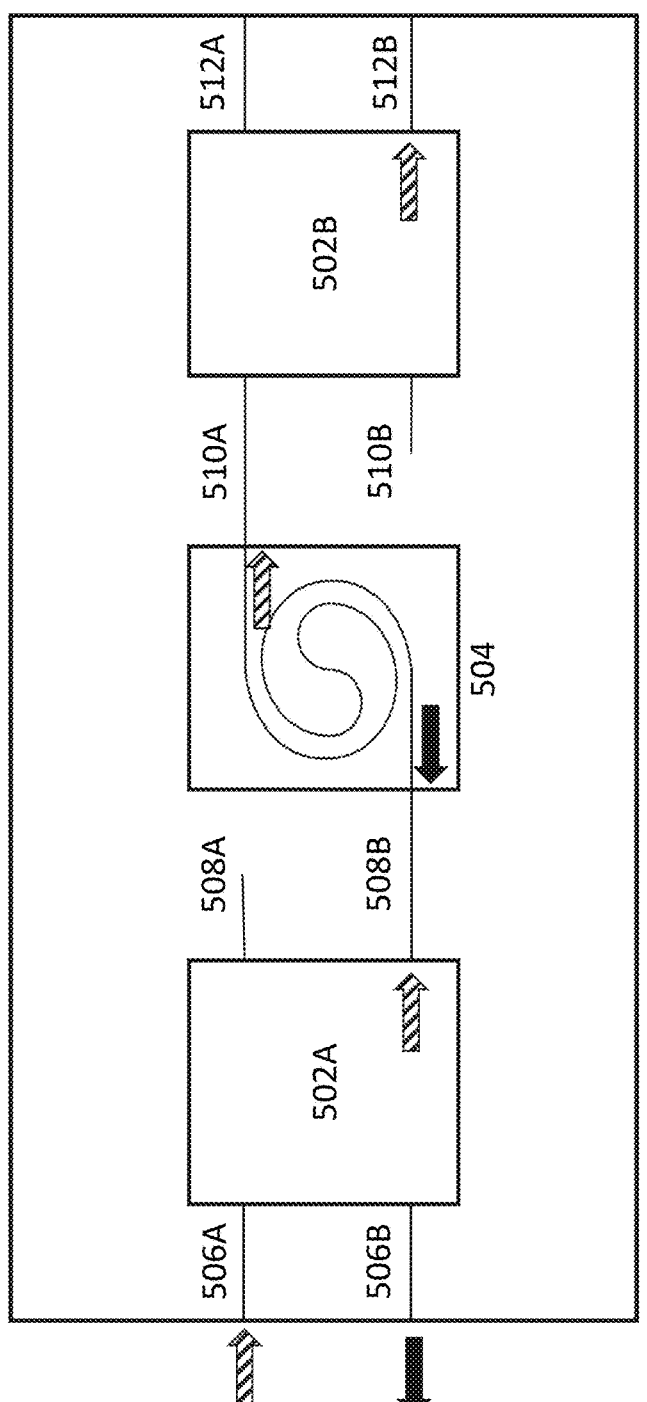
*FIG. 5B*

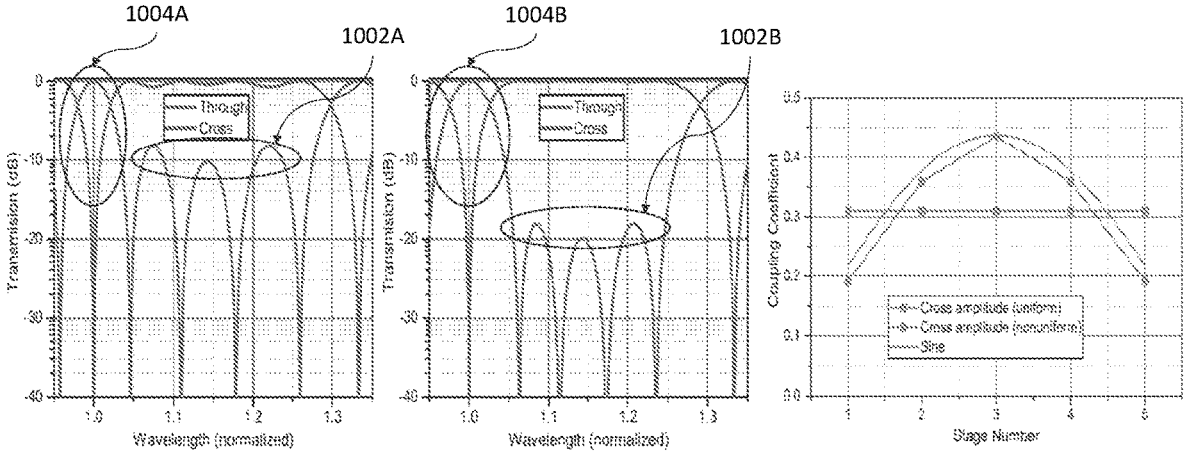
FIG. 10A                    FIG. 10B                    FIG. 10C

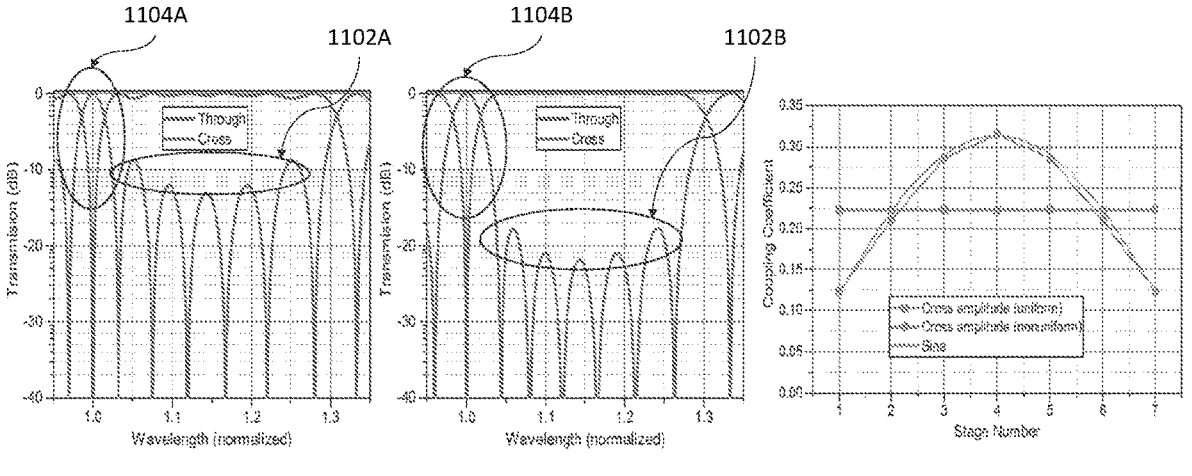
FIG. 11A                    FIG. 11B                    FIG. 11C

METHODS AND APPARATUSES FOR PHOTONIC FILTERING USING NONUNIFORM LATTICE FILTERS

CROSS-REFERENCE TO RELATED APPLICATIONS

This application claims priority to U.S. Provisional Patent Application No. 63/354,537, filed Jun. 22, 2022, the contents of which are incorporated by reference herein in their entirety.

BACKGROUND

Field of the Invention

The present application relates generally to methods and apparatuses for photonic filtering using nonuniform lattice filters.

Description of Related Art

The field of photonic integrated circuits (PICs) has rapidly expanded over the past four decades. While PICs are widely used in data and communications, they are also used in the fields of healthcare, automotive sensors, and even agriculture. In its most basic form, a PIC is a circuit that detects, generates, transports, and/or processes light. A PIC can be made up of one or more photonic components. One type of component is a waveguide-based photonic filter. In general, a filter allows certain wavelengths, or frequencies, to be efficiently transmitted while blocking or reflecting others. A number of interferometric waveguide filters exist including Mach-Zehnder interferometers, which when combined in series are commonly referred to as lattice filters. In a lattice filter, there are generally two output ports. One output port is designed to pass a certain frequency band while suppressing others. The degree to which the transmission in the "pass" port and the suppression in the "block" port are achieved are critical design parameters for PICs. While conventional filters can suppress unwanted signals, to a degree, it would be beneficial to have lattice filters that can provide even greater suppression over arbitrarily wide optical bandwidths.

SUMMARY OF THE INVENTION

One or more the above limitations may be diminished by structures and methods described herein.

In one embodiment, an apparatus for photonic filtering using nonuniform lattice filters is provided. The apparatus includes a plurality of directional coupler-differential delay devices connected in series and an end-stage directional coupler. Each of the directional coupler-differential delay devices includes a directional coupler section and a differential delay section. Each directional coupler section has a corresponding coupling constant. A first of the plurality of directional coupler-differential delay devices is constructed to receive a pump and a signal. The end-stage directional coupler is connected in series to a last of the plurality of directional coupler-differential delay devices and includes an input port, a through port, and a cross port. The end-stage directional coupler is constructed to receive the pump and the signal at the input port. The end-stage directional coupler has another coupling constant, and at least one of a plurality of coupling constants respectively corresponding to a plurality of directional coupler sections and the other coupling constant corresponding to the end-stage directional coupler are different. The signal is output on the through port of the end-stage directional coupler, and the pump is output on the cross port of the end-stage directional coupler.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5A is a plan schematic view of a PIC 500 that includes a plurality of lattice filters and a sensor, according to one embodiment;

FIG. 5B is a plan schematic view of a PIC 500 that includes a plurality of lattice filters and a sensor, according to another embodiment;

FIG. 10A is a plot of transmission versus normalized wavelength for a 4-stage uniform lattice filter;

FIG. 10B is a plot of transmission versus normalized wavelength for a 4-stage nonuniform lattice filter according to one embodiment;

FIG. 10C is a plot of coupling coefficients versus stage number for the lattice filters whose performance is demonstrated in FIGS. 10A and 10B;

FIG. 11A is a plot of transmission versus normalized wavelength for a 6-stage uniform lattice filter;

FIG. 11B is a plot of transmission versus normalized wavelength for a 6-stage nonuniform lattice filter according to one embodiment;

FIG. 11C is a plot of coupling coefficients versus stage number for the lattice filters whose performance is demonstrated in FIGS. 11A and 11B;

Figure 1:
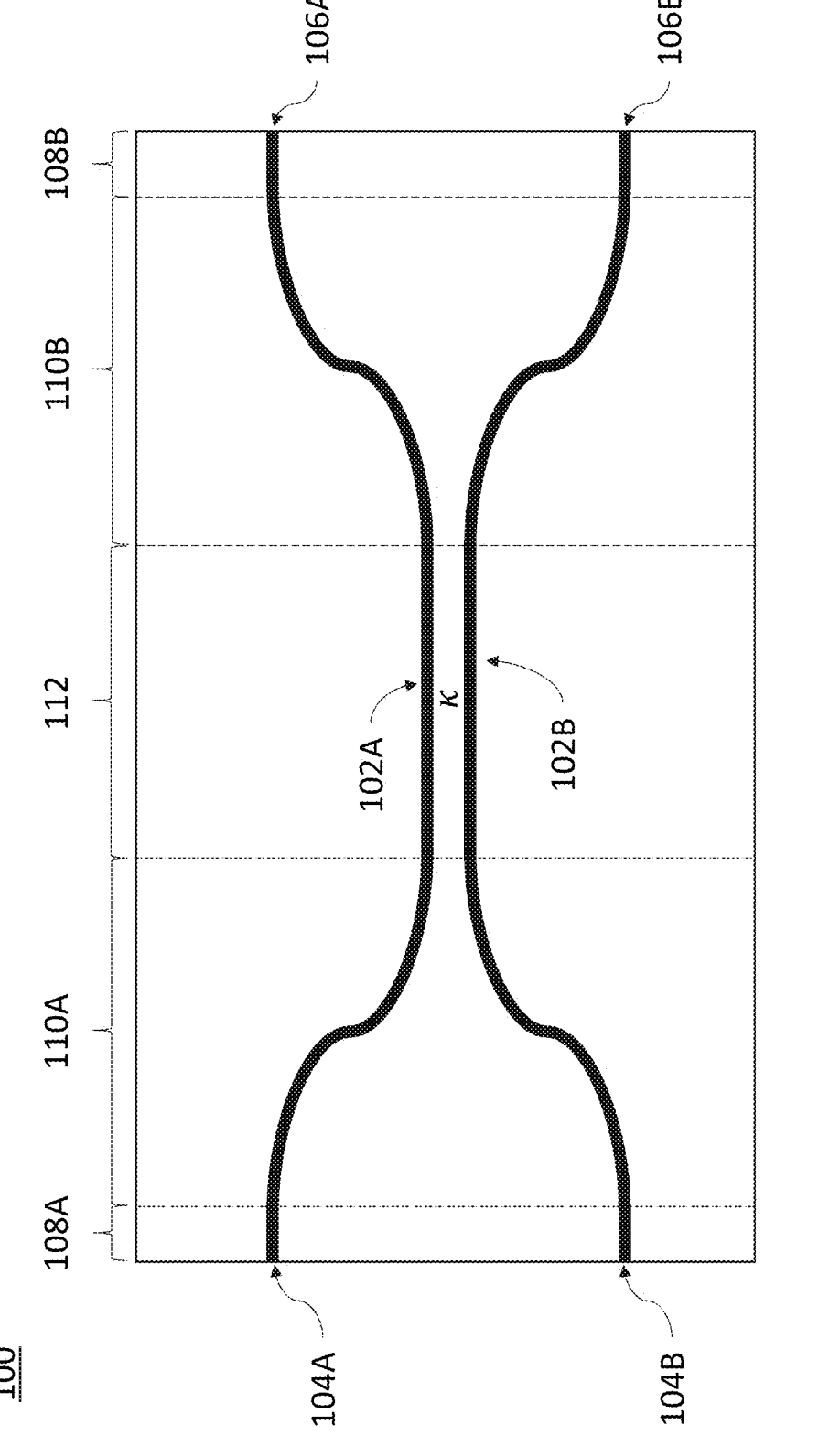
FIG. 1 is a plan schematic view of a directional coupler.

Different ones of the Figures may have at least some reference numerals that are the same in order to identify the same components, although a detailed description of each such component may not be provided below with respect to each Figure.

DETAILED DESCRIPTION OF THE PREFERRED EMBODIMENTS

In accordance with example aspects described herein are methods and apparatuses for photonic filtering using non-uniform lattice filters.

FIG. 1 is a plan schematic view of a directional coupler (DC) 100 according to one embodiment. Two waveguides are provided in DC 100, namely waveguide 102A and waveguide 102B. As is self-evident from FIG. 1, in some portions of DC 100 waveguides 102A and 102B are spaced apart from one another, while in another region, namely the waist region 112, the waveguides 102A and 102B are closer together. DC 100 includes two input ports 104A and 104B that are capable of receiving light. In one mode of operation, light may be injected into both ports 104A and 104B. In another mode of operation, light may be injected into one port but not the other. Thus, for example, light may be injected into input port 104A but not port 104B or vice versa. Light injected into ports 104A and/or 104B may, in one embodiment, travel a short distance in an input region 108A where waveguides 102A and 102B are spaced far enough apart that a wavefunction corresponding to light traversing through one waveguide does not extend into the other waveguide. In another embodiment, the input region 108A may be omitted and light received at 104A and/or 104B may be directly injected into the transition region 110A. In the transition region 110A, the waveguides 102A and 102B are brought closer together until a desired spacing is achieved. At that point, a waist region 112 begins where the waveguides 102A and 102B are spaced apart at a desired spacing. The spacing between waveguides 102A and 102B is sufficiently small such that a wavefunction corresponding to light traveling in one waveguide extends into the other waveguide resulting in a coupling between the waveguides. Thus, for example, the wavefunction for light propagating in waveguide 102A may extend into waveguide 102B, and as a result light begins to propagate in waveguide 102B as well waveguide 102A. The converse may also be true, namely the wavefunction for light propagating in waveguide 102B may extend into waveguide 102A and begin propagating in waveguide 102A as well as waveguide 102B. This phenomenon is known as coupling and the amount of coupling is determined by the coupling constant κ. After the waist region 112, the waveguides 102A and 102B are spaced apart in another transition region 110B. The purpose of transition region 110B is to separate the waveguides 102A and 102B such that the distance between them becomes too great for light to couple between them. Finally, an output region 108B is provided and includes output ports 106A and 106B for waveguides 102A and 102B, respectively. In another embodiment, the output region 108B may be omitted and light output from the transition region 110B is output from DC 100.

Figure 2:
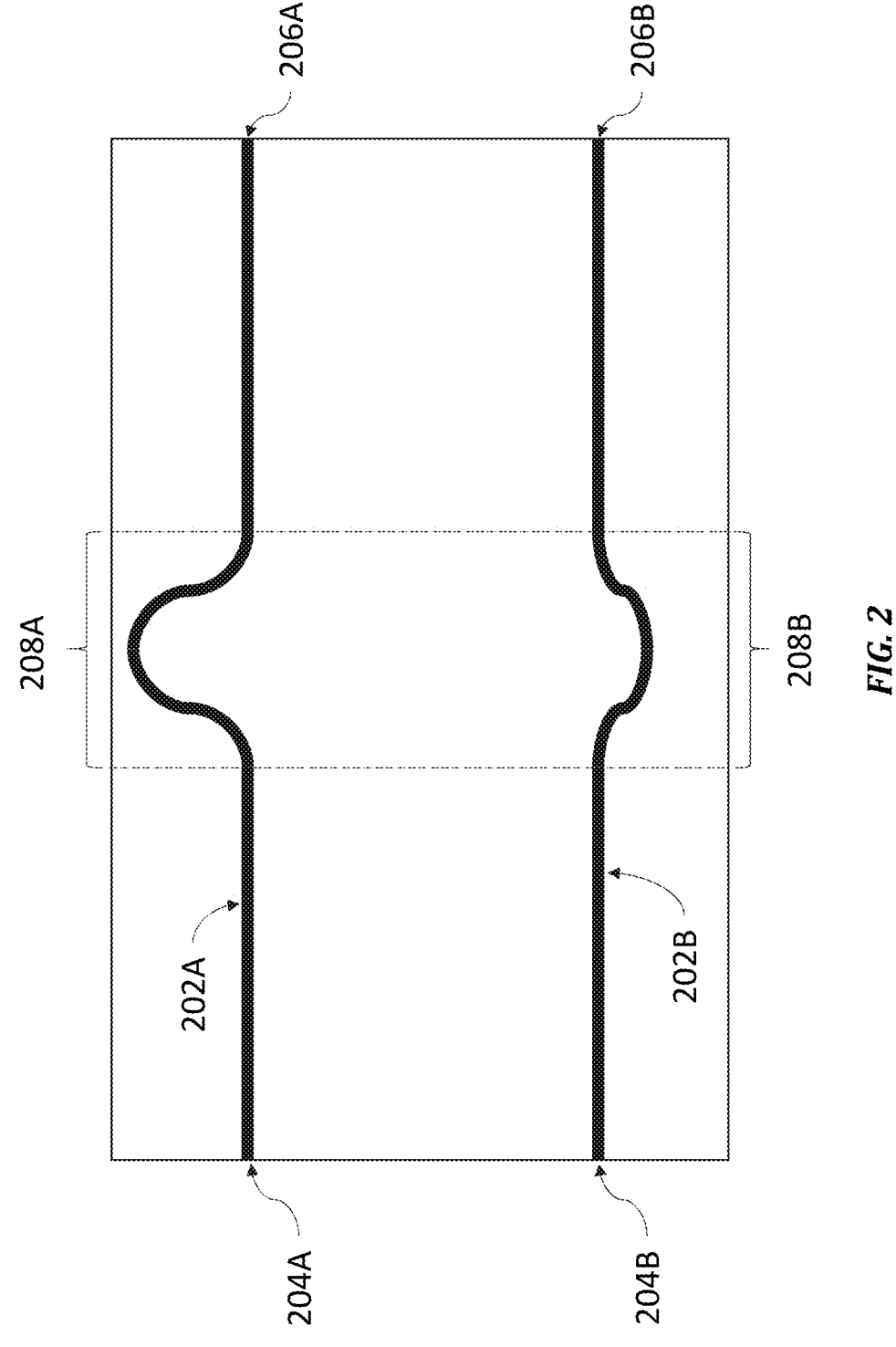
FIG. 2 is a plan schematic view of a differential delay device.

FIG. 2 is a plan schematic view of a differential delay (DD) 200 according to one embodiment. In FIG. 2, two waveguides 204A and 204B are provided. Waveguide 202A is configured to receive light through input port 204A. Similarly, waveguide 202B is configured to receive light through input port 204B. In contrast to a DC, such as DC 100, in DD 200 waveguides 202A and 202B are spaced apart by a distance that substantially prevents coupling. In general, a DD operates by having light propagating in one waveguide travel a longer path than light traveling in the other waveguide. This creates a delay between when the light is output from DD 200. The amount of delay depends upon the difference in path length (ΔL). In FIG. 2, light in waveguide 202A traverses a longer path compared to waveguide 202B. Although, as one of ordinary skill will appreciate, this could also be reversed such that light in waveguide 202B traverses a longer path compared to waveguide 202A. The difference in path length (ΔL) is due to the difference in lengths of the first and second delay sections 208A and 208B. As illustrated in FIG. 2, in this exemplary embodiment, the length of the first delay section 208A is greater than the length of the second delay section 208B. However, as one of ordinary skill in the art will recognize, the second delay section 208B could have a longer path length than the first delay section 208A in an alternative embodiment. Light exits the DD 200 by output ports 206A and 206B, respectively corresponding to waveguides 202A and 202B.

Figure 3:
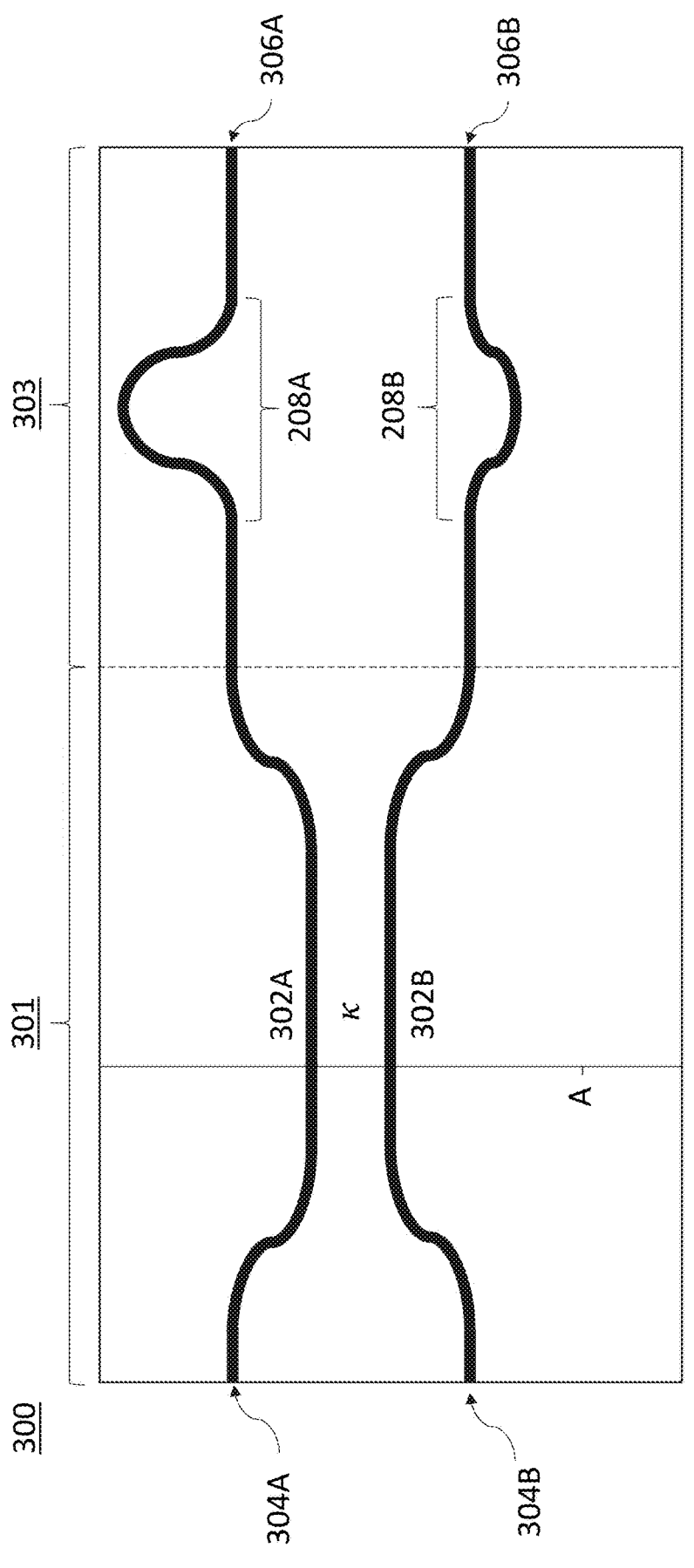
FIG. 3 is a plan schematic view of an integrated directional coupler and differential delay device.

In FIGS. 1 and 2, DC 100 and DD 200 are shown as separate devices. However, DC 100 and DD 200 may be integrally formed. FIG. 3 is exemplary. FIG. 3 is a plan schematic view of a direction coupler-differential delay (DC-DD) device 300 according to one embodiment. DC-DD 300 includes two waveguides 302A and 302B. In section 301 of DC-DD 300, the waveguides 302A and 302B are arranged substantially the same as DC 100, and thus section 301 functions as DC 100 with a coupling constant κ. In section 303, waveguides 302A and 302B are arranged substantially the same as DD 200, and thus section 303 functions as a DD 200. Thus, light injected into port 304A and/or 304B passes through both a directional coupler section 301 and a differential delay section 303, and (depending on the design of those sections) may emerge from output ports 306A and 306B. Having described a DC 100, DD 200, and DC-DD 300, attention will now be directed to using DCs and DDs to construct a uniform lattice filter.

Figure 4A:
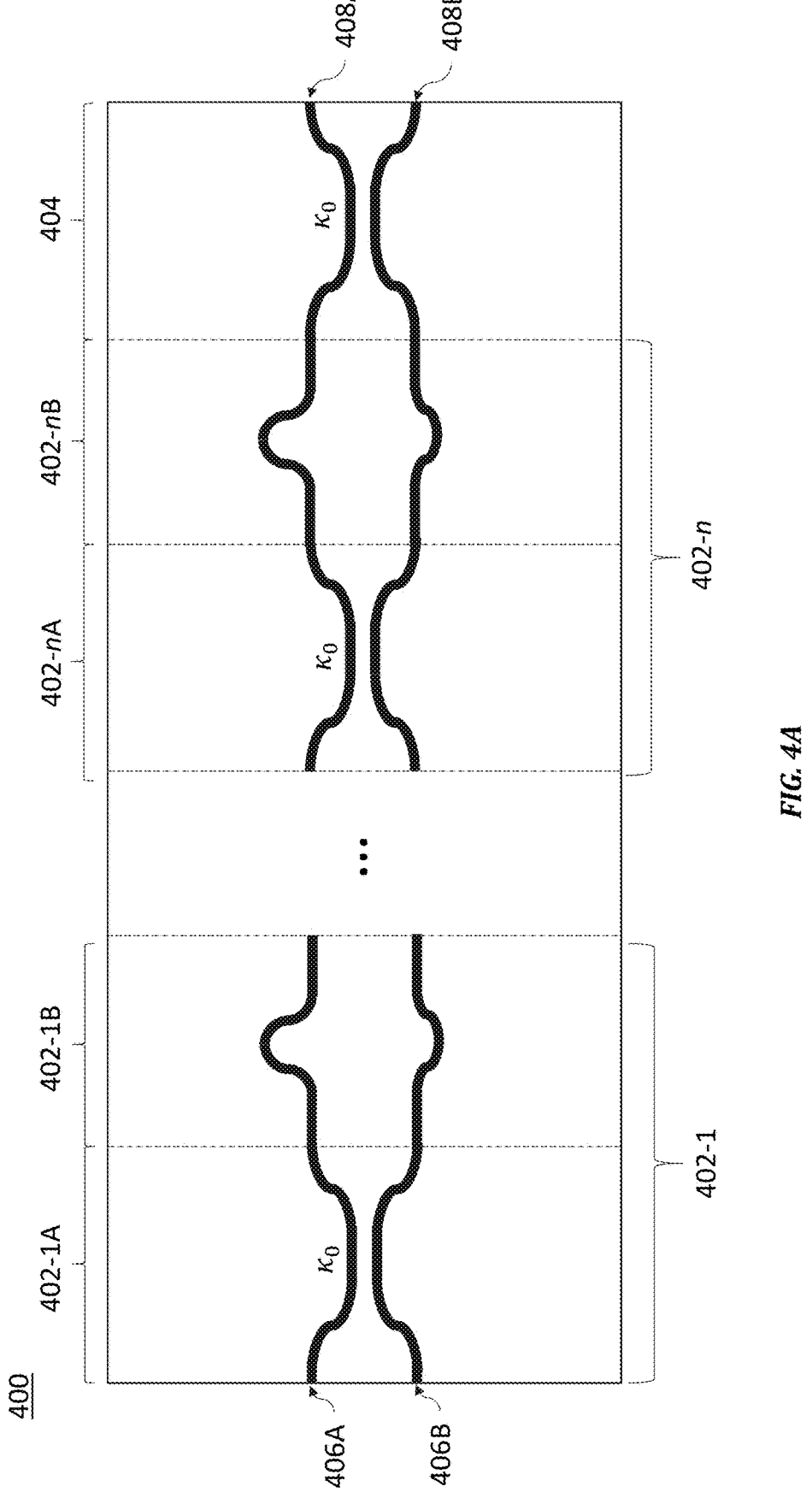
FIG. 4A is a plan schematic view of a uniform lattice filter that including a plurality of directional coupler and differential delay sections.
Figure 4B:
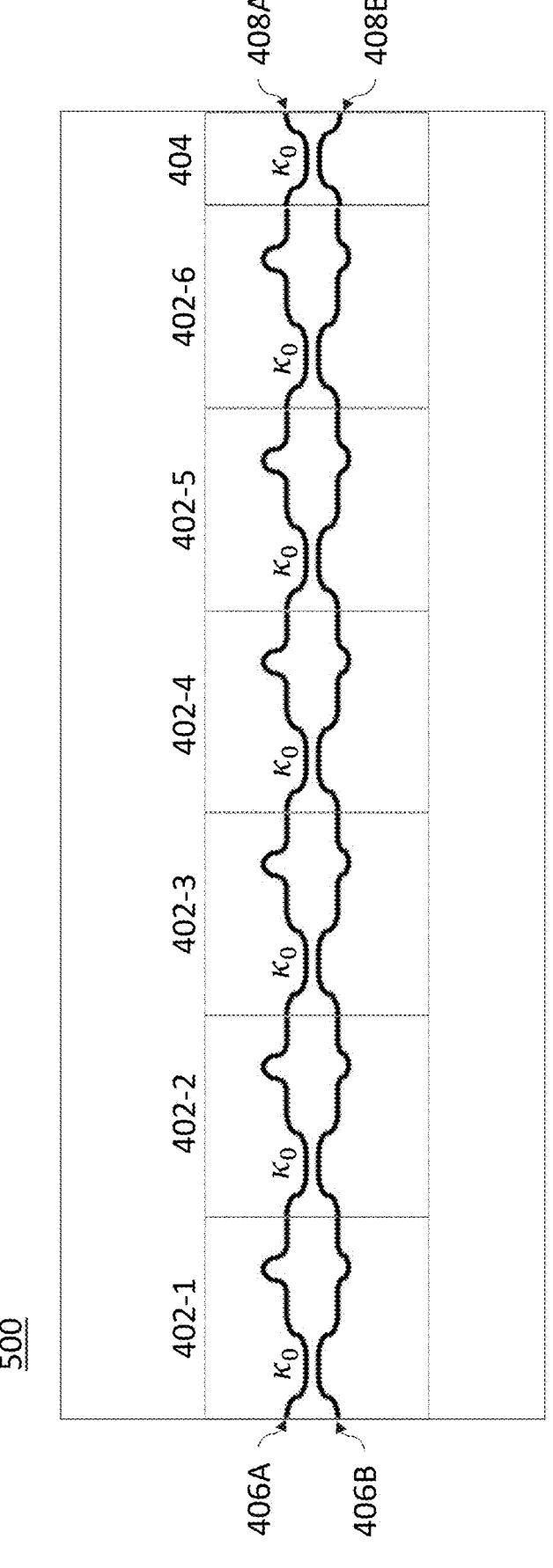
FIG. 4B is a plan schematic view of a 6-stage uniform lattice filter.

FIG. 4A is a schematic plan view of a uniform lattice filter 400 according to one embodiment. As shown in FIG. 4, lattice filter 400 includes a plurality of DC-DD devices 402-1 ... 402-n, which may also be referred to as stages. The number of DC-DD devices 402 (n) could be any number, but is shown here for 4, 6, or 8. Each DC-DD device is connected in series to a subsequent device. FIG. 4B is illustrative. FIG. 4B shows a six-stage lattice filter 500 that includes six DC-DD devices 402-1, 402-2, 402-3, 402-4, 402-5, and 402-6 connected in series. Such that an output of a preceding DC-DD device is connected to the input of a subsequent DC-DD device in the direction in which light propagates through the lattice filter, i.e., from the input ports 406A and 406B to the output ports 408A (also known as a through port) and 408B (also known as a cross port). Also included is a DC 404 whose input is connected to the output of DC-DD device 402-6, i.e., the last DC-DD device in the direction of light propagation. The outputs of DC 404, the through port 408A and cross port 408B, serve as the output of the n-stage lattice filter 400. Having described the layout of an n-stage uniform lattice filter 500, attention will now be directed to its materials and construction.

Figure 7A:
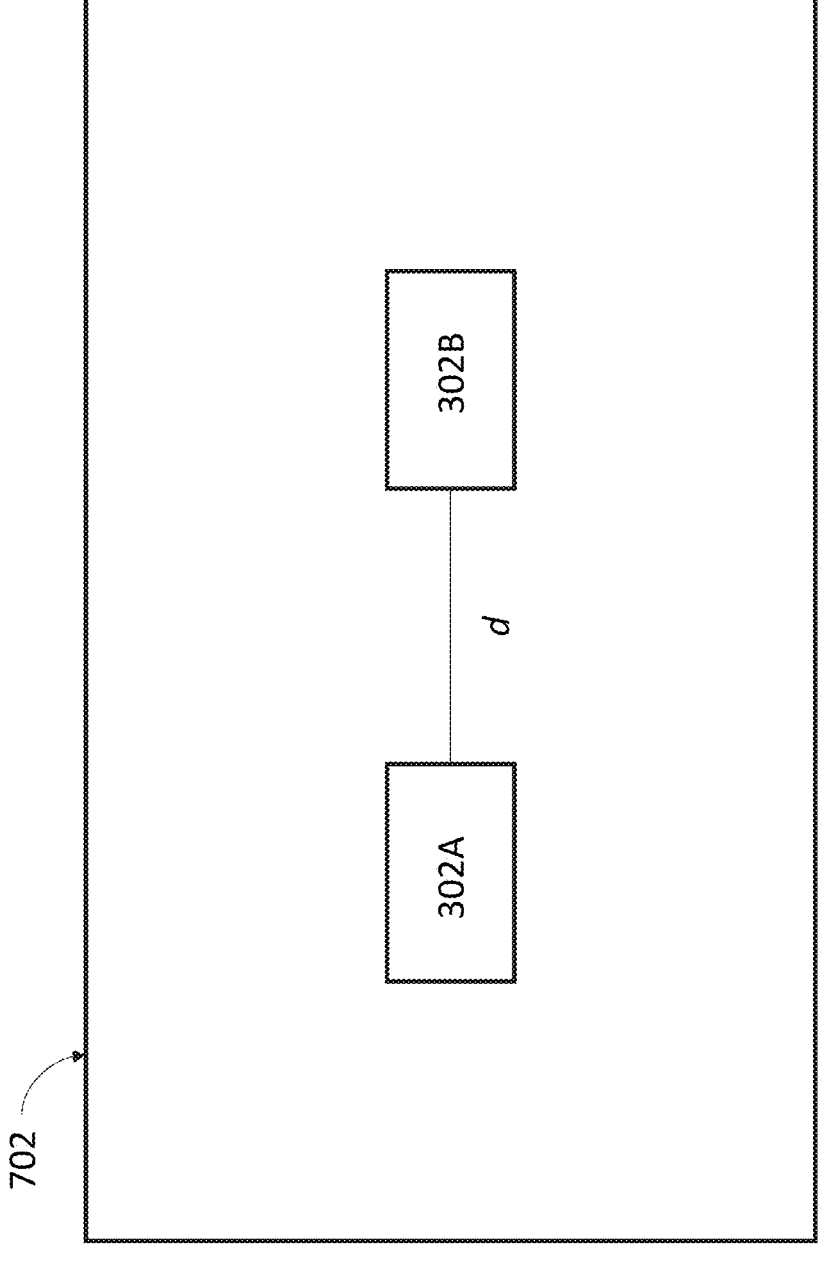
FIGS. 7A-E are cross-sectional views of exemplary waveguide cores in relation to one or more cladding materials.
Figure 7B:
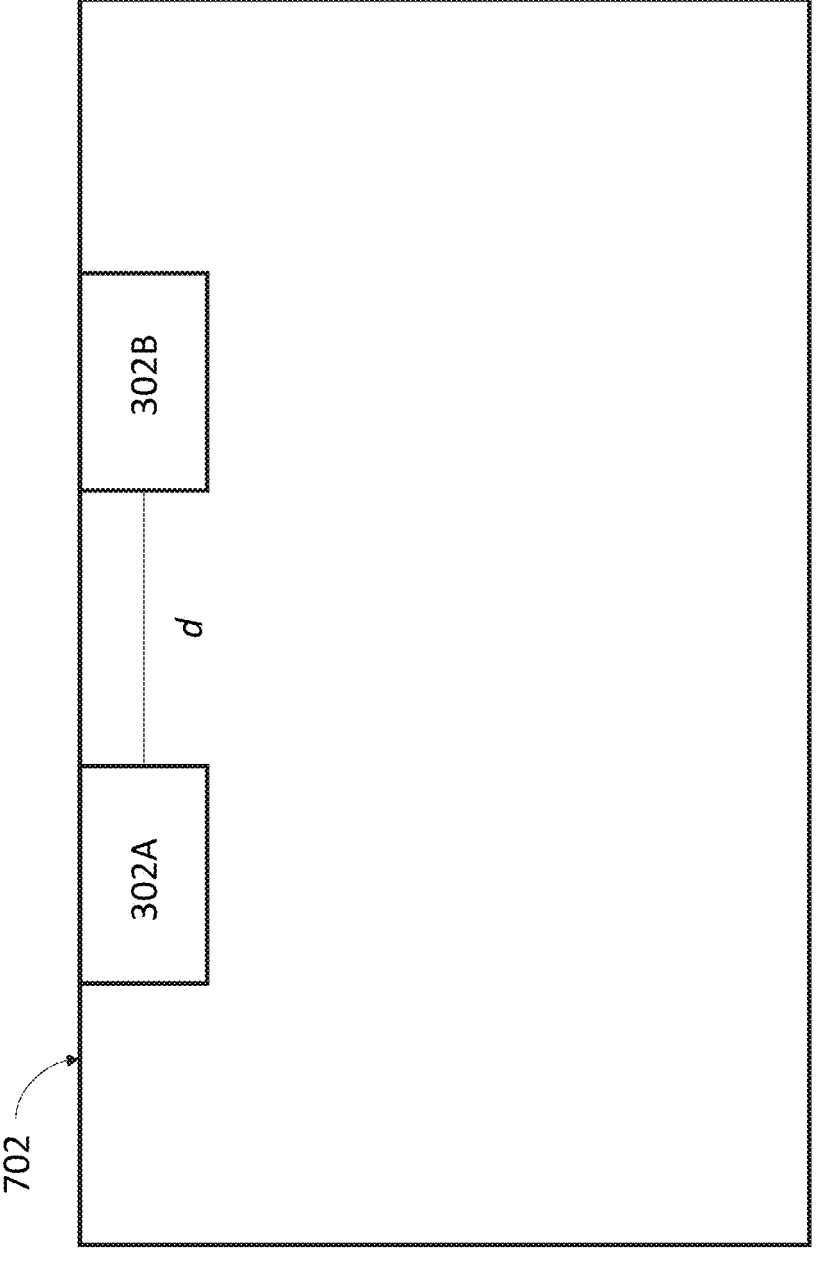
Figure 7C:
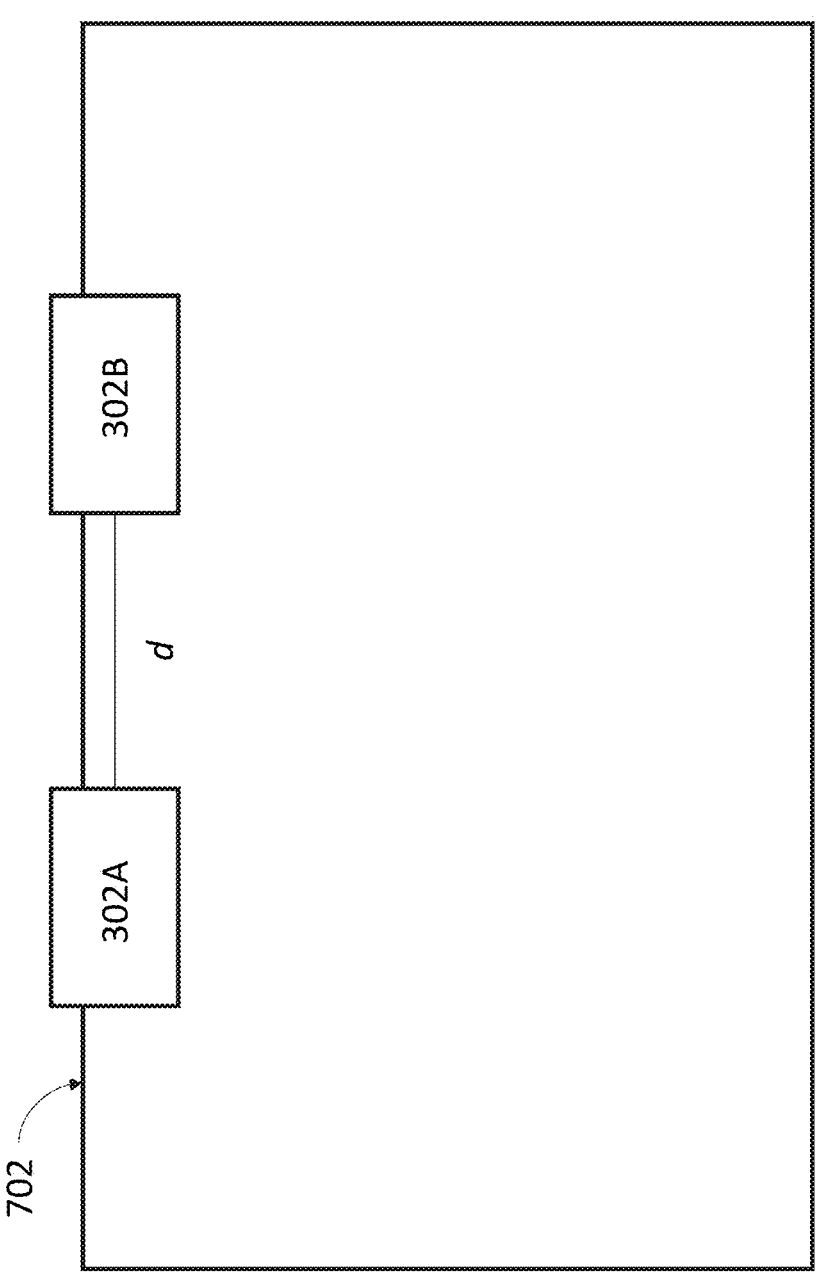
Figure 7D:
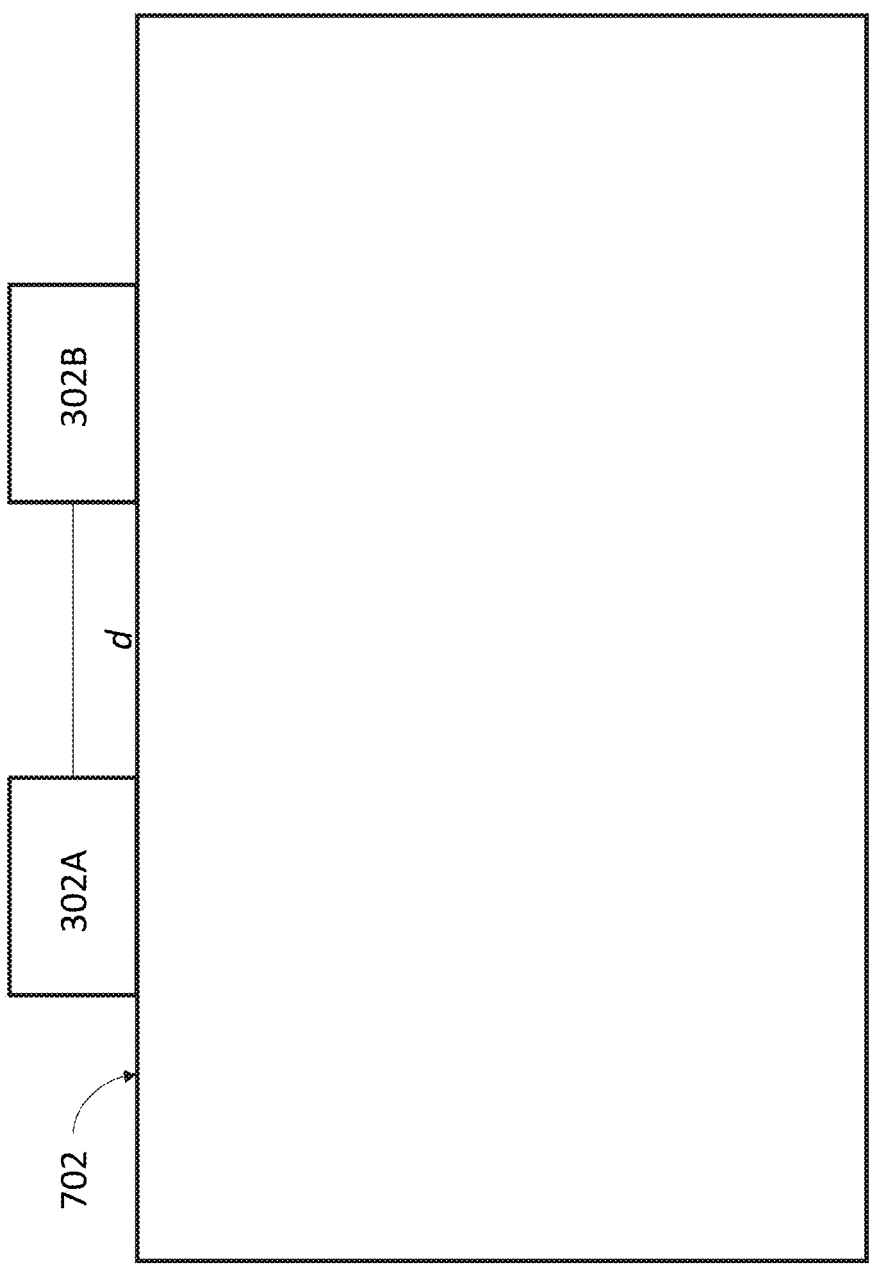
Figure 7E:
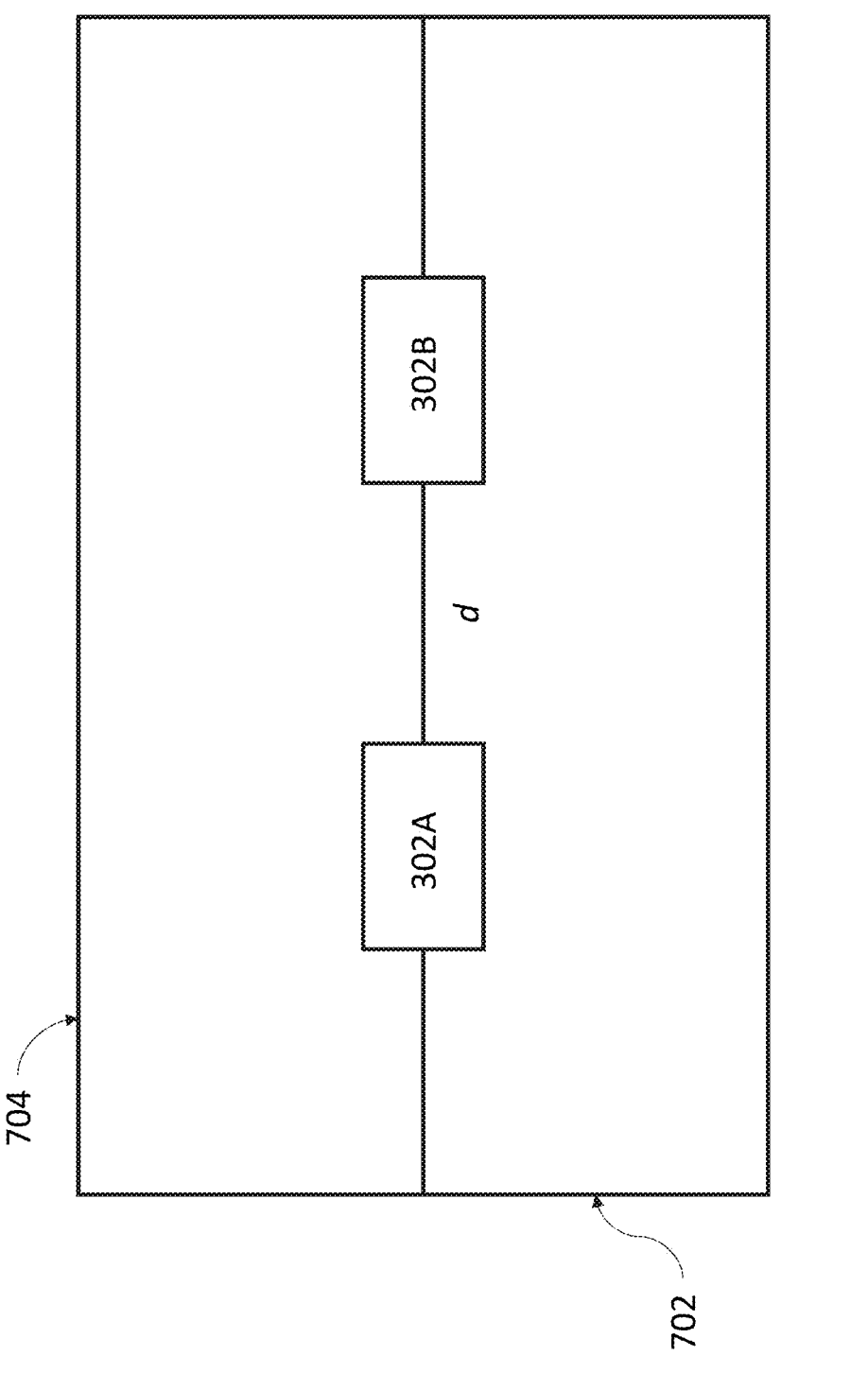

FIG. 7A is a cross-sectional view of a DC-DD device 300 taken along line A in FIG. 3. As shown in FIG. 7A, waveguides 302A and 302B are embedded in a cladding material 702. However, in an alternate embodiment, the waveguides 302A and 302B may be positioned at a surface of the cladding material 702 layer, as shown in FIG. 7B, in which case atmosphere forms a cladding for at least one side of waveguides 302A and 302B. In yet another embodiment, shown in FIG. 7C, waveguides 302A and 302B partially protrude from the cladding material 702. In a still further embodiment, waveguides 302A and 302B may be positioned on top of the cladding material 702, whereby atmosphere acts as a cladding of the exposed portions of waveguides 302A and 302B. In yet another embodiment, a second cladding material 704 may be provided such that cladding materials 702 and 704 completely surround the waveguides 302A and 302B, as illustrated in FIG. 7E.

In terms of materials, the waveguide core disclosed herein, including waveguide cores 302A and 302B, may be formed of any material which is partially or completely surrounded by a cladding material (or atmosphere) with a lower index of refraction than the waveguide core material. Exemplary waveguide core materials include: silicon nitride, alumina, titania, glass, silicon, gallium arsenide, indium phosphate, germanium, and combinations thereof, so long as those combinations have a higher index of refraction than the cladding material. An exemplary cladding material is silicon dioxide. In FIGS. 7A-E, the waveguides 302A and 302B are shown as ridge waveguides with a generally rectangular cross-section. However, the invention is not so limited to rectangular cross-sectional shapes. Any suitable waveguide may be used as waveguides 302A and 302B including optical fiber, rib waveguides, nanoslot waveguides, subwavelength waveguides, or multi-layer waveguides.

A uniform lattice filter, such as filters 400 and 500, may be formed, in one embodiment, by photolithography. First, the desired waveguide material is deposited on a cladding material 702 layer, which acts as a substrate. Photoresist, either positive or negative, is then applied to the deposited waveguide material. A photomask that defines a pattern for forming the plurality of DC-DD devices comprising the lattice filter is then placed on top of the deposited photoresist and exposed to electromagnetic radiation. If positive photoresist was applied, then the photoresist that was exposed to the electromagnetic radiation, i.e., it was not covered by the photomask, is removed when exposed to a developing solution. If negative photoresist was used, then the opposite occurs; areas that were covered by the photomask are removed by the developer solution. Of course, the type of photoresist (positive or negative) used must correspond to the patterned photomask. After exposure to the developer, a photoresist pattern remains on top of the waveguide material layer. An etch process is then performed whereby areas of the waveguide material layer that are not covered by photoresist are removed to a predetermined thickness by controlling the etch rate and time. Then, the remaining photoresist is chemically stripped leaving waveguides, corresponding to the patterned photomask and lattice filter design, on top of the substrate. If desired, an additional cladding layer of the substrate material or a different material may then be deposited on the formed waveguides and substrate to partially or completely embed the waveguides. The dimensions, shape and position of the waveguides are controlled by the photomask and the deposition and etching processes. In one embodiment, the waveguides designed for visible for near-IR wavelengths are rectangular waveguides with a width between 100 nm and 2000 nm, inclusive, and a thickness between 10 nm and 1000 nm, inclusive.

Having described how waveguides 302 and 304 may be formed to create a lattice filter, attention will now be directed to constructing an n-stage nonuniform lattice filter. The difference between an n-stage uniform lattice filter and an n-stage nonuniform lattice filter is that in an n-stage uniform lattice the coupling constants respectively corresponding to the plurality of directional coupler sections are the same whereas in an n-stage nonuniform lattice filter at least one of the coupling constants corresponding to one of the directional coupler sections is different from the other coupling constants respectively corresponding to the other directional coupler sections. A nonuniform lattice filter could also be made from differential delay sections of different delays, i.e., the path length may be varied for each delay section. To provide a roadmap for the remaining of the specification, attention will first be directed to determining a coupling constant for an n-stage uniform lattice filter at a wavelength of a pump (laser), hereinafter $\kappa_0$. That coupling constant, $\kappa_0$, will then be used to generate n+1 coupling constants ($\kappa_1$ . . . $\kappa_{n+1}$) for an n-stage nonuniform lattice filter. The materials and processes used to form the n-stage nonuniform lattice filter are generally the same as those described above for the uniform lattice filter, but a discussion of how an n-stage nonuniform lattice filter may be designed will be provided without duplicating information provided above. Then, the performance of an n-stage uniform lattice filter will be compared to the performance of an n-stage nonuniform lattice filter formed as described below. Finally, an exemplary PIC using an n-stage nonuniform lattice filter will be shown and described with reference to FIGS. 5 and 6.

To begin, attention will be directed to deriving the coupling constant $\kappa_0$ for an n-stage uniform lattice filter 400. To derive the coupling constant $\kappa_0$ for an n-stage uniform lattice filter 400, we begin by considering how the DC sections and DD sections that constitute the n-stage uniform lattice filter 400 are modeled. A DC device 100, with a coupling constant $\kappa$ can be modeled using a transfer matrix approach in which a 2×2 matrix relates the optical fields at the input ports 104A and 104B to the output ports 106A and 106B, each represented by 2×1 column vectors. The transfer matrix for a DC device 100 is given by:

$$S^{DC} = \begin{bmatrix} \tau_t & -i\kappa \\ -i\kappa & \tau_b \end{bmatrix} \qquad \text{Equation 1}$$

where $|\tau_t|^2 = |\tau_b|^2 = |\tau|^2$ is the "through" power coupling coefficient, $|\kappa|^2$ is the "cross" power coupling coefficient with $|\kappa|^2 = 1 - |\tau|^2$. These complex coupling coefficients depend strongly on the physical properties of DC device 100 and contain phase information that may be different between waveguide 102A and waveguide 102B due to different optical path lengths within the DC device 100.

In a similar manner, the DD device 200 can be modeled using another transfer matrix given by:

$$S^{DD} = \begin{bmatrix} e^{-i\beta\Delta L} & 0 \\ 0 & 1 \end{bmatrix} \qquad \text{Equation 2}$$

where $\Delta L$ is the differential path length of the DD device 200 and $\beta = 2\pi n_{eff}/\lambda$ is the waveguide propagation constant for the design mode. As one of ordinary skill will appreciate, this describes the phase of the light as it propagates down the waveguide. Since light is in both the core and cladding as it propagates the effective refractive index ($n_{eff}$) is a combination of the two for the mode. In Equation 2, A is the free space wavelength, and $n_{eff}$ is the effective index of the waveguide mode. The transfer matrix for an n-stage uniform lattice filter formed by connecting n DC-DD devices 300 in series, followed by a DC device 100 in series, may be found by multiplying the matrices for each component, which is given by (Equation 3):

$$S^{LF} = S^{DC} \prod_{j=1}^{n} S_j^{DD} S_j^{DC}$$

Exemplary performance is achieved by coordinating the DC coupling and DD differential phase shift for maximum extinction on the through port (output port 408A in FIG. 4A; port 408B is the cross port) at the desired laser wavelength, while also maximizing the free spectral range (FSR). Thus, the DD sections are designed to ensure differential phase shifts per stage equal to an integer multiple of $2\pi$ at the primary filter resonance, and the DC sections are designed to provide the appropriate coupling at this wavelength. Here, appropriate coupling is that coupling which would insure a minimum of transmission (ideally, zero) at the primary filter resonance (wavelength) in the through port (see Equation 5 below). At the laser wavelength, the uniform lattice filter is equivalent to (n+1) symmetric DCs connected directly in series and for identical DCs Equation 3 above can be written as (Equation 4):

$$\begin{bmatrix} |\tau| & -i|\kappa| \\ -i|\kappa| & |\tau| \end{bmatrix}^{(n+1)} \begin{bmatrix} \cos((n+1)\theta & -i\sin((n+1)\theta \\ -i\sin((n+1)\theta & \cos((n+1)\theta \end{bmatrix}$$

where $\theta = \arctan(\sqrt{1-|\tau|^2}/|\tau|)$. Optimal coupling for light entering a single input port (e.g., port 406A) of the uniform lattice filter is then given by setting the diagonal elements of Equation 4 to zero, giving (Equation 5):

$$\cos[(n+1)\arctan(\sqrt{1-|\tau|2/|\tau|})]=0$$

Using Equation 5, one can solve for $|\tau|^2$ for any value of n. With $|\tau|^2$ in hand, one can then determine $\kappa_0$ for that same value of n using $|\kappa_0|^2=1-|\tau|^2$. Thus, for a 4-stage uniform lattice the solution of Equation 5 yields $|\tau|^2=0.905$ and $|\kappa_0|^2=0.095$ and for an 8-stage uniform lattice filter, $|\tau|^2=0.970$ and $|\kappa_0|^2=0.03$.

Figure 8:
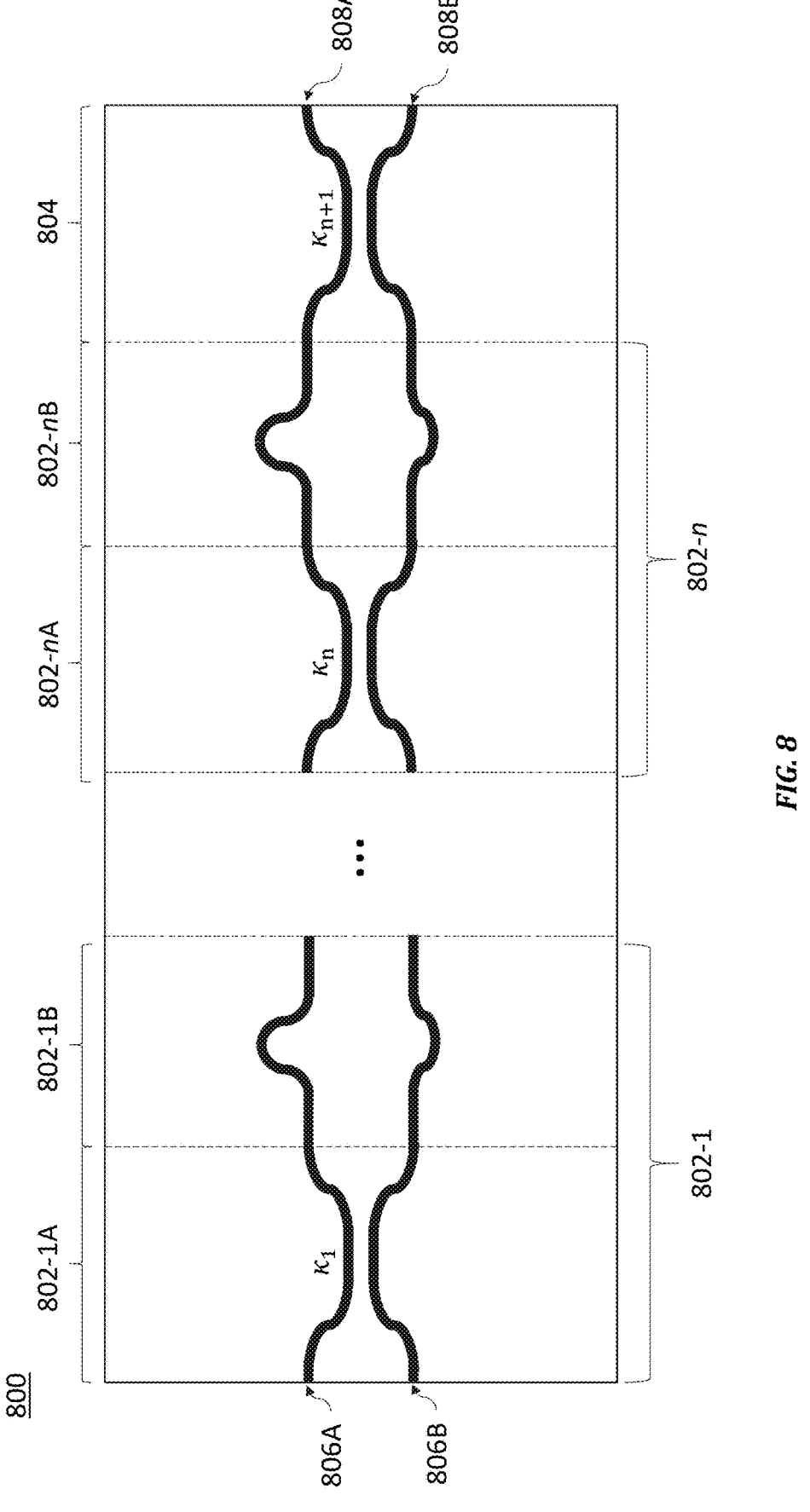
FIG. 8 is a plan schematic view of an n-stage nonuniform lattice filter according to one embodiment.

Having shown and described an n-stage uniform lattice filter where the coupling constant is the same for the n+1 directional coupler stages, attention will now be directed to designing an n-stage nonuniform lattice filter where each DC stage has a unique coupling constant. FIG. 8 shows an n-stage nonuniform lattice filter 800 according to one embodiment. The n-stage nonuniform lattice filter 800 includes n DC-DD devices 802-1 . . . 802-n. The DC-DD devices 802-1 . . . 802-n include n DC sections 802-1A . . . 802-nA and n DD sections 802-1B . . . 802-nB, respectively. However, unlike a uniform lattice filter, the coupling constant (K) is not the same for each DC section 802-1A . . . 802-nA. Rather, each DC section 802-1A . . . 802-nA has a corresponding coupling constant $\kappa_j$ resulting in plurality of coupling constants $\kappa_j$ . . . $\kappa_n$. It should be noted that directional couplers can achieve very constant coupling across wide wavelength bands. Thus, for this invention, wavelength-independent coupling is assumed. As noted above, the delays ($\Delta$Ls) for each section can also be different, but for simplicity below they will all be assumed to be equal. However, as noted above, all of the coupling constants do not have to be different from each other. Rather, in one embodiment, the n+1 coupling constants may have a symmetrical distribution about a DC section located midway in the nonuniform lattice filter. For example, in the case of a 4-stage nonuniform lattice filter, there are 5 coupling constants ($\kappa_1$, $\kappa_2$, $\kappa_3$, $\kappa_4$, $\kappa_5$) respectively corresponding to four DC sections and one end stage DC. If these coupling constants have a symmetrical distribution, then $\kappa_1=\kappa_5$ and $\kappa_2=\kappa_4$, while $\kappa_3$ is unique.

Figure 9:
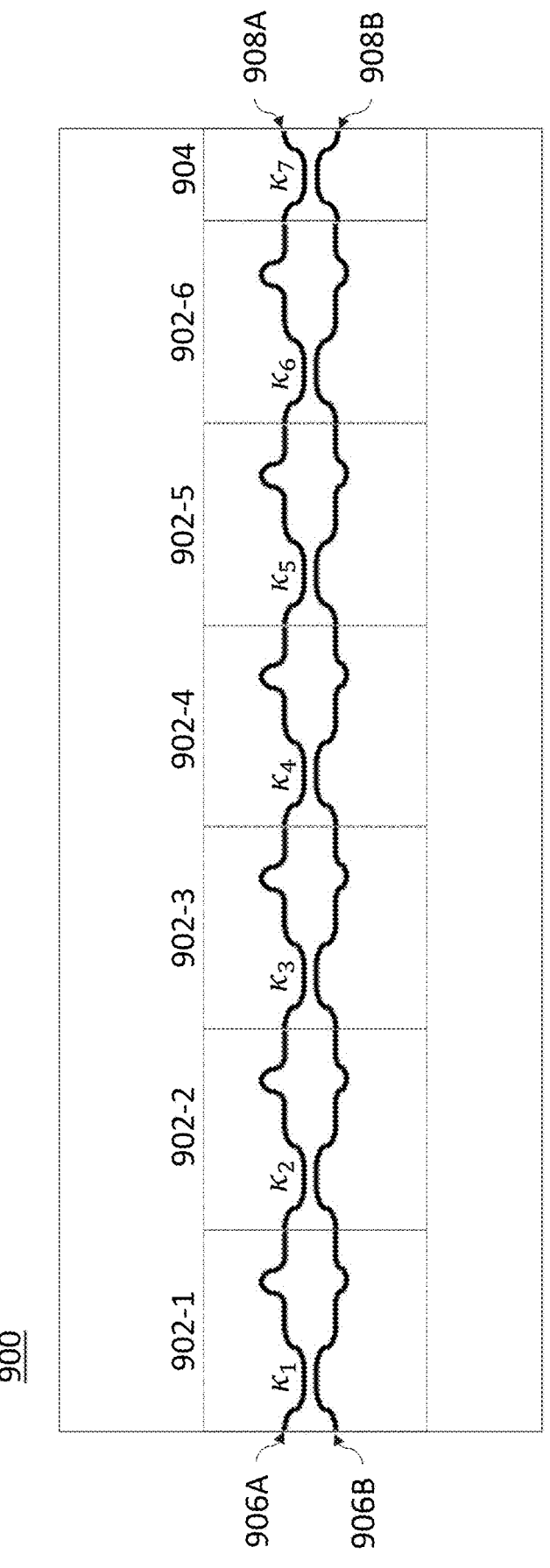
FIG. 9 is a plan schematic view of a 6-stage nonuniform lattice filter according to one embodiment.

The nonuniform lattice filter 800 includes two input ports 806A and 806B and two output ports 808A (also known as the through port) and the 808B (also known as the cross port). Using nonuniform coupling constants for the DC sections 802-1A . . . 802-nA, allows for improved signal blocking in the cross port (808B) without sacrificing transmission of the pump (or laser) in the cross port 808B. Since complete, or substantially complete, transmission of the laser in the cross requires only perfect, or nearly perfect, destructive interference in the final through port (i.e., output 808A), each stage 802-1 . . . 802-n of the filter 800 can have a different coupling constant. Or, as described above, the coupling constants may have a symmetrical distribution. As long as the net phase of the pump (or laser) wavelength after all of the stages results in perfect, or near perfect, interference, efficient laser transmission in the cross port 808B can still be achieved. Also, by using nonuniform coupling constants, the ripple in the signal blockband (which can be present in a similar uniform lattice filter) can be suppressed, but at the expense of the laser passband bandwidth. The ripple in the signal blockband is due to the phase accumulation in the n-DD sections of an n-stage uniform lattice filter such that an n-stage lattice filter can appear to have a net delay of n$\Delta$L. This would appear to reduce the FSR by a factor of n, creating constructive interference in the through port every FSR/n, though with poor efficiency due to improper couplings. Nevertheless, this ripple fundamentally limits the signal block in the cross port of a uniform lattice filter. However, unequal coupling constants suppress this ripple by broadening the wavelengths over which destructive interference occurs, at the expense of the inter-ripple extinction. The coupling constants for an n-stage nonuniform lattice filter are, in one embodiment, given by (Equation 6):

$$\kappa_j=\sqrt{2}\kappa_0 \sin[\pi j/(n+2)]$$

where $\kappa_0$ is the coupling constant determined above for an n-stage uniform lattice filter 400. Thus, for example, for a 6-stage nonuniform lattice filter 900 (shown in FIG. 9) there will be 7 coupling constants. More specifically, coupling constants $\kappa_1$, $\kappa_2$, $\kappa_3$, $\kappa_4$, $\kappa_5$, and $\kappa_6$, respectively correspond to the DC sections of DC-DD devices 902-1, 902-2, 902-3, 902-4, 902-5, and 902-6. Coupling constant $\kappa_7$ corresponds to an end-stage DC section 904. As discussed above, it is possible for two or more of these coupling constants to be the same or approximately the same. Also shown in FIG. 9 are input ports 906A and 906B, and output ports 908A (through port) and 908B (cross port).

To design an n-stage nonuniform lattice filter, the first step is to determine the difference in path length $\Delta$L for each of the DD sections 802-1B . . . 802-nB. By setting this difference in path length $\Delta$L, the primary laser wavelength, typically the wavelength of the pump, is set along with the FSR. The differential delay sections also determine the wavelengths of the filter maxima (for the cross port) or the filter minima (for the through port). Next, the number of stages in the n-stage nonuniform lattice filter is selected by the filter designer, and then the coupling constant ($\kappa_0$) for an equivalent n-stage uniform lattice filter is determined (if not determined in advance). Equation 6 is then used, in a preferred embodiment, to determine the (n+1) coupling constants for the n-stage nonuniform lattice filter. The materials for the waveguides and cladding may then be selected, and based on those selections the physical dimensions of the waveguides and cladding layers may be determined. With those dimensions in hand, the n-stage nonuniform lattice filter may be fabricated using, for example, the photolithography technique described above or a fabrication process that is unique to a certain foundry. For example, an n-stage nonuniform lattice filter with silicon nitride waveguides may be constructed using the AIM Photonics Process Design Kit. In regards to selecting the length of a delay section, in one embodiment, the delay is chosen based on Equation 7 below $$\Delta L = m\lambda/n_{eff}$$

where is the pump wavelength and m is the order of the lattice filter. A larger order will give a narrower filter passband but a smaller FSR. Equation 7 also assumes a symmetric directional coupler design in which the two paths are identical, or substantially identical. However, an asymmetric design may also be used where the paths are not identical. This design will introduce a delay that will have to be subtracted from the above calculation to get a proper filter wavelength. For a pump (laser) wavelength of 1064 nm and a signal band of approximately 1100 nm to 1300 nm, a nonuniform lattice filter with silicon nitride waveguides of 0.8 microns wide and 0.22 microns thick and surround by silicon dioxide cladding may be constructed. These widths and thicknesses were chosen to give single TM mode operation in this wavelength band for a SiN core. This signal band range lies within the infrared, but as the invention is not so limited. Depending on material selections, the path length ΔL and core width and thickness may be chosen such that the filter wavelength falls within the near-infrared, mid-infrared, far-infrared, visible, or ultraviolet regions. In addition, both modes of light that are predominantly polarized in-plane (quasi-TE) or out-of-plane (quasi TM) can be used for either the pump (laser) or the signal. Waveguides of any size can be used for the n-stage nonuniform lattice filter depending on the core-cladding combination. For each such combination, there exists a range of waveguide thicknesses and widths that permit single-mode operation without adding excessive loss or other deleterious effects. For PICs, typically <1 dB/cm is considered good, and >1 dB/cm is considered not good. But other waveguide thicknesses can also be used such as those that permit multi-mode operation, or extremely large modes with small core widths or thickness. Finally, in an alternate embodiment, the DC sections 802-1A . . . 802-nA could be replaced with other coupling approaches such a multi-mode interference (MMI) couplers, vertical coupling, and y-branch couplers. The transfer matrix shown above would be the same for these other coupling approaches.

Figures 12A, 12B, 12C:
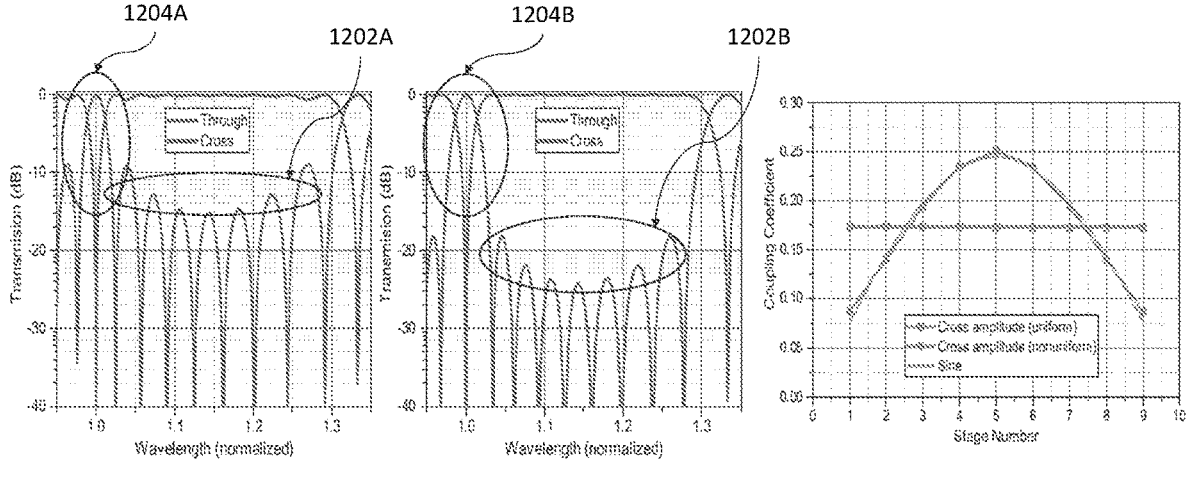
FIG. 12A is a plot of transmission versus normalized wavelength for an 8-stage uniform lattice filter.
FIG. 12B is a plot of transmission versus normalized wavelength for an 8-stage nonuniform lattice filter according to one embodiment.
FIG. 12C is a plot of coupling coefficients versus stage number for the lattice filters whose performance is demonstrated in FIGS. 12A and 12B.

FIGS. 10A-C, 11A-C, and 12A-C illustrate the performance of uniform lattice filters with the same coupling constant compared nonuniform lattice filters as described above. FIGS. 10A, 11A, and 12A depict scenarios where a pump (or laser) is injected into input port 406A and a signal is injected into port 406B of a 4, 6, and 8 stage uniform lattice filters, respectively. The output from the through port (output port 408A) and cross port (output port 408B) are plotted against normalized wavelength in which a wavelength of one corresponds to the pump (laser wavelength) and wavelengths between approximately 1 and 1.3 correspond to the signal. FIGS. 11B, and 12B depict scenarios where a pump (or laser) is injected into input port 806A and a signal is injected into port 806B of a 4, 6, and 8 stage nonuniform lattice filters, respectively, whose coupling constants are given by Equation 6 above. The output from the through port (output port 808A) and cross port (output port 808B) are plotted against normalized wavelength in which a wavelength of one corresponds to the pump (laser wavelength) and wavelengths between approximately 1 and 1.3 correspond to the signal. Finally, FIGS. 10C, 11C, and 12C are plots of the coupling constants (also known as coupling coefficients) for the uniform filters, the nonuniform filters according to Equation 6, and a sine curve.

Comparing FIGS. 10A and 10B, it is clear that the 4-stage nonuniform lattice filter performs better than the 4-stage uniform lattice filter. There is a reduction in signal stopband ripple (compare 1002A with 1002B) of approximately 10 dB in the 4-stage nonuniform lattice filter with no reduction in laser transmission. However, the passband for the laser in the cross port (output port 808B) is broadened in the 4-stage nonuniform lattice filter compared to the uniform 4-stage lattice filter (compare 1004A and 1004B). A comparison of FIGS. 11A and 11B and 12A and 12B show a similar result, with a 20 dB improvement in signal blocking in the cross port 808B across approximately 90% of the FSR (compare 1102A with 1102B, 1104A with 1104B, 1202A with 1202B, and 1204A with 1204B).

Figure 6:
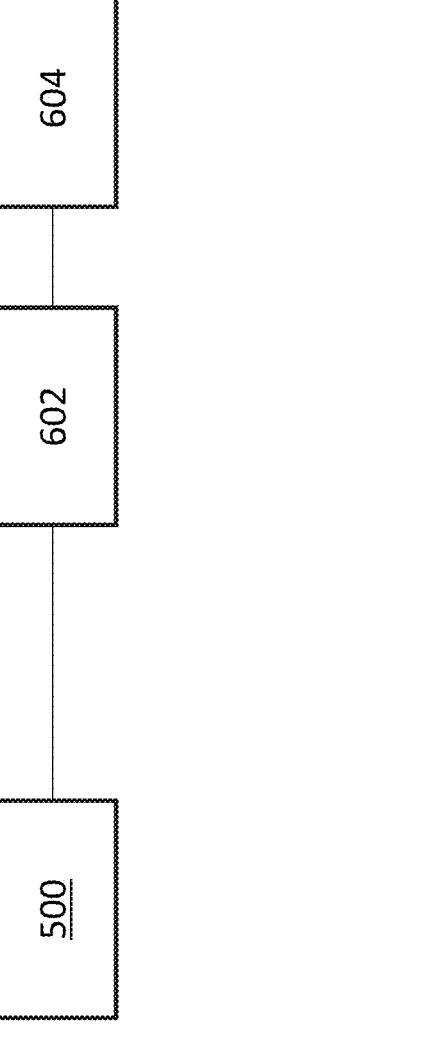
FIG. 6 is a plan schematic view of a system for processing a photonic signal received by PIC 500.

FIG. 5A shows a PIC 500 that includes a first nonuniform lattice filter 502A, a second nonuniform lattice filter 502B, and a sensor 504. In one embodiment, sensor 504 may be a material which is excited by the pump and emits energy inelastically at lower energies. This emission can be in the form of fluorescence or Raman scattering and the material in sensor 504 can be identified based on the signature emission spectrum. The material may also have a thin sorbent layer for absorbing trace vapors from the atmosphere or absorbing biomarkers from an aqueous film with a corresponding signature emission spectrum. Lattice filter 502A includes injection ports 506A and 506B, an output port 508A (through port), and an output port 508B (cross port). In FIG. 5, a pump (laser) is injected into the input port 506A of the nonuniform lattice filter 502A and, as described above, is provided to the cross port 508B. Since no signal was injected into filter 502A as port 506B, no signal is output from output port 508A (which in turned is not connected to another component). Cross port 508B serves as an injection port for sensor 504. The output of sensor 504 is provided to the injection port 510A of lattice filter 502B. In the manner described above, lattice filter 502B is constructed is cause the signal from sensor 504 to be passed on the through port 512A (but blocked on cross port 512B) of filter 502B, and the pump (laser) is passed on the cross port 512B (but blocked on the through port 512A). FIG. 6 shows a system 600 for processing the signal recorded by PIC 500. The signal output from the through port 512A may be provided to a detector, such as a photodiode or a spectrometer, and converted into an electrical signal which is then passed to a computer 604 for processing. In FIG. 5A, the signal is shown propagating toward ports 512A and 512B. This mode of operation is called a forward scatter since the signal is going in the same direction as the pump (at 510A). But, in another embodiment, the signal can be created in the opposite direction too (called "backscatter") and would exit via ports 508B and 506B.

Described above are methods and apparatuses for photonic filtering using nonuniform lattice filters. These filters allow a narrow wavelength band (referred as the pump or laser above) to be efficiently passed in the filter's cross port, but blocked in the through port, while all other wavelengths (referred to as the signal above) are efficiently passed in the through port, but blocked in the cross port. The nonuniform lattice filters described above can achieve much deeper blocking in a filter stopband than can a uniform lattice filter (where the coupling constants are the same) without sacrificing the blocking performance at the broad filter passband. Deep signal blocking in a single filter allows the use of fewer filters, or few stages in a single filter, to achieve a required filter performance. A photonic circuit with fewer filters, or small filters, is less likely to suffer from fabrication inhomogeneities, takes up less space, and is cheaper to fabricate.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. An apparatus for photonic filtering, comprising:
a plurality of directional coupler-differential delay devices connected in series, wherein each of the directional coupler-differential delay devices includes a directional coupler section and a differential delay section, wherein each directional coupler section has a corresponding coupling constant, and wherein a first of the plurality of directional coupler-differential delay devices is constructed to receive a pump and a signal; and
an end-stage directional coupler connected in series to a last of the plurality of directional coupler-differential delay devices, wherein the end-stage directional coupler includes an input port, a through port, and a cross port, wherein the end-stage directional coupler is constructed to receive the pump and the signal at the input port, wherein the end-stage directional coupler has another coupling constant,
wherein coupling constants respectively corresponding to the directional coupler sections and the other coupling constant corresponding to the end-stage directional coupler are based on:
(i) a total number (n) of directional coupler sections in the plurality of directional coupler-differential delay devices,
(ii) a uniform coupling constant for an n-stage uniform lattice filter, and
(iii) a number (j) denoting an integer, where j is between 1 and n+1,
wherein at least one of the coupling constants respectively corresponding to a plurality of directional coupler sections and the other coupling constant corresponding to the end-stage directional coupler are different, and
wherein the signal is output on the through port of the end-stage directional coupler, and the pump is output on the cross port of the end-stage directional coupler.

2. The apparatus of claim 1, wherein the plurality of directional coupler-differential delay devices comprise a plurality of waveguides and cladding material.

3. The apparatus of claim 2, wherein the plurality of waveguides are embedded in the cladding material.

4. The apparatus of claim 2, wherein the plurality of waveguides are positioned at a surface of the cladding material.

5. The apparatus of claim 2, wherein the plurality of waveguides are positioned on top of the cladding material.

6. The apparatus of claim 2, wherein the cladding material has a lower index of refraction than material forming the plurality of waveguides.

7. The apparatus of claim 2, wherein the plurality of waveguides are formed from: silicon nitride, alumina, titania, glass, silicon, gallium arsenide, indium phosphate, germanium, or a combination thereof.

8. The apparatus of claim 2, wherein the plurality of waveguides are: optical fiber, rib waveguides, nanoslot waveguides, subwavelength waveguides, or multi-layer waveguides.

9. The apparatus of claim 1, wherein the uniform coupling constant for the n-stage uniform lattice filter is based on a through power coupling coefficient.

10. The apparatus of claim 1, wherein each differential delay section has a different path length.

11. The apparatus of claim 1, wherein values for the coupling constants respectively corresponding to the directional coupler sections and the other coupling constant for the end-stage directional coupler have a symmetrical distribution.

* * * * *